Oct. 9, 1956  F. COCKERELL  2,765,616
GAS TURBINE DRIVE FOR POWER VEHICLES
Filed Oct. 2, 1950  2 Sheets-Sheet 1

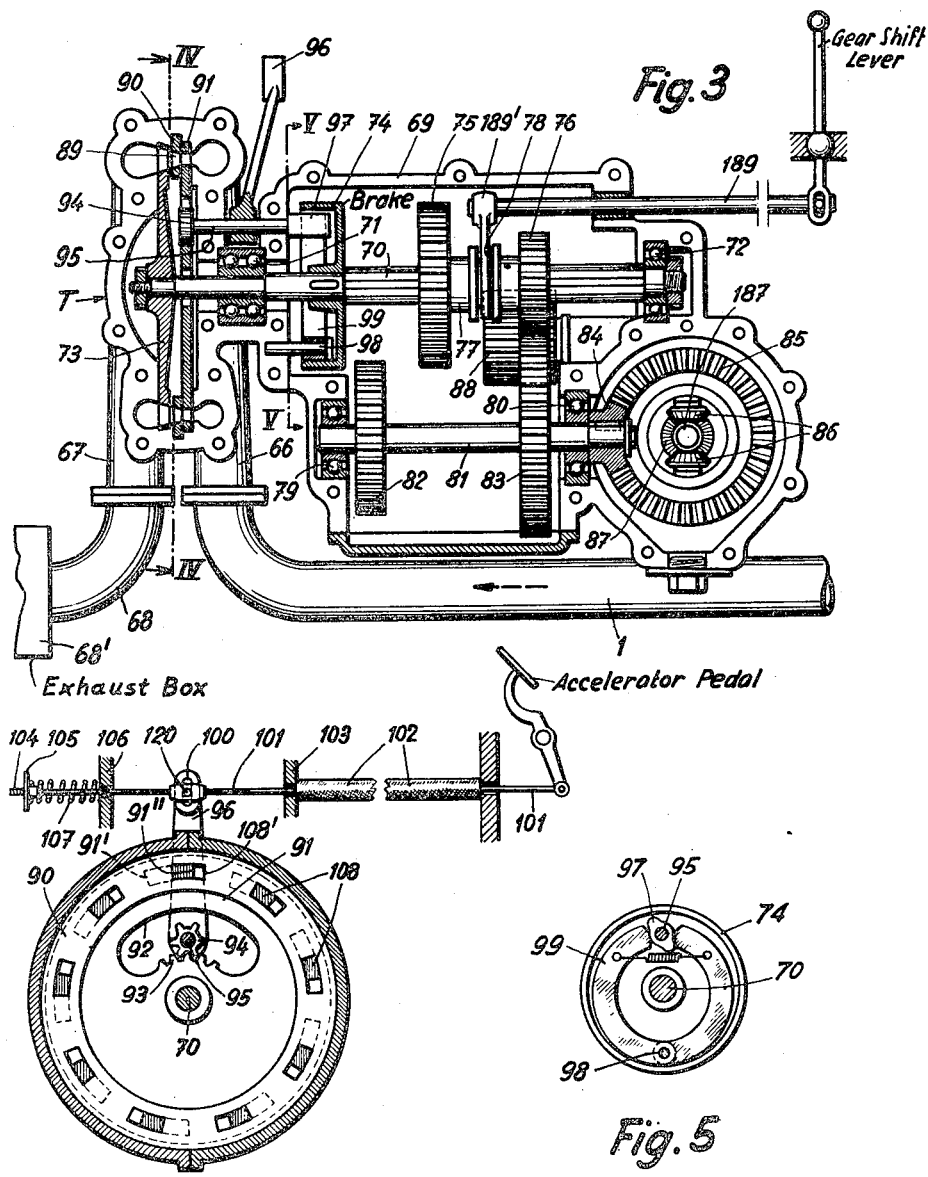

United States Patent Office 2,765,616
Patented Oct. 9, 1956

2,765,616

GAS TURBINE DRIVE FOR POWER VEHICLES

Fritz Cockerell, Munich, Germany, assignor to Turbo A. G., Basel, Switzerland

Application October 2, 1950, Serial No. 188,050

Claims priority, application Switzerland October 3, 1949

12 Claims. (Cl. 60—13)

The present invention relates to driving a power vehicle by means of a gas turbine.

Vehicles have heretofore commonly been provided with a change speed gear so as to provide a wide range of vehicle speeds while maintaining the engine speed as nearly constant as possible. Proposals have been made to use a gas turbine for driving a vehicle but such proposals have been found to be uneconomical and therefore of no practical value.

In accordance with the present invention, the vehicle is powered by a gas turbine to which gas under pressure is supplied by a gas generator. This is accomplished by holding substantially constant the quantity, i. e. weight, of gas delivered per unit of time to a gas receiver with which the inlet aperture of the gas turbine is connected and controlling the size of the inlet aperture so as to vary the pressure of gas in the receiver and thereby vary the pressure and velocity of the gas fed to the turbine. Since the quantity of gas delivered to the receiver by the gas generator is substantially constant, a decrease in the size of the inlet aperture of the gas turbine causes pressure to build up in the receiver so that the gas supplied to the turbine is under higher pressure and hence flows with greater velocity. The quantity of fuel supplied to the gas generator is automatically governed in accordance with changes in load so as to maintain the speed of the generator, and hence the quantity of gas delivered per unit of time, substantially constant.

Thus, changes in load and speed of the gas turbine are not obtained as heretofore by changing the quantity, i. e. the weight, of gas flowing per unit of time through the turbine but rather by changing the pressure of the gas, and hence its velocity, the quantity of air remaining substantially constant.

This invention has substantial advantages in driving power vehicles. The speed of power vehicles, and especially of motor cars, varies over a wide range and the variations are frequent, with corresponding variations of the tip speed of the turbine rotor. In order to have the turbine work economically at each speed, the velocity of flow of the gas must vary accordingly. In other words, a specific ratio of tip speed of the rotor to the admission velocity of the pressure gas should be maintained. This is accomplished by varying the pressure of the power gas and hence varying the temperature drop in the turbine.

This results in great advantage in economy and has the further advantage of providing high torque, due to the fact that the gas generator runs at a substantially constant working speed, the quantity of air and gas delivered per unit of time being held substantially constant. Hence, the generator is always running at normal speed and need not be accelerated upon increased power demand. The gas generator is hence capable of instantaneously reacting upon each change in load.

It is further important to note that the turbine drive in accordance with the invention, and hence the vehicle, is easy to control since the driver has only to change the size of the inlet aperture to the turbine by means of a single control element which may conveniently be coupled with the conventional accelerator pedal. The quantity of fuel fed to the gas generator is automatically controlled by a governor, for example a centrifugal governor, reacting upon small changes of speed of the gas generator. This is possible because an increase in pressure against which the gas generator works causes an increased power consumption so that the speed of the generator would tend to drop. However, upon a slight decrease in speed, the governor comes into action and increases the quantity of fuel fed to the gas generator so that the normal working speed of the generator is restored. Conversely, a decrease in pressure decreases the load on the generator so that its speed will tend to increase. The governor is thereupon effective to decrease the fuel supply and thereby maintain the speed of the generator substantially constant.

The invention also comprises a turbine drive for a vehicle characterized by the fact that the gas generator comprises a plurality of units, each including a combustion cylinder and piston and a compressor-cylinder and piston, the two pistons of each unit being rigidly connected with one another to form a double piston. The pistons of the several units are kinematically coupled together, for example by means of an inclined disc mechanism located in an air receiver with which the outlets of the compressor cylinders communicate. The combustion cylinders preferably operate as an internal combustion two-cycle spark ignition engine, air from the receiver being used for scavenging in the combustion cylinders.

The invention will be more fully understood from the following description and accompanying drawings which show, by way of example, a preferred embodiment of mechanism for carrying out the invention.

In the drawings:

Fig. 3 is a central longitudinal section of the gas turbine and associated transmission and differential.

Fig. 4 is a cross-section taken approximately on the line IV—IV of Fig. 3.

Fig. 5 is a cross-section taken approximately on the line V—V of Fig. 3.

Figure 1:
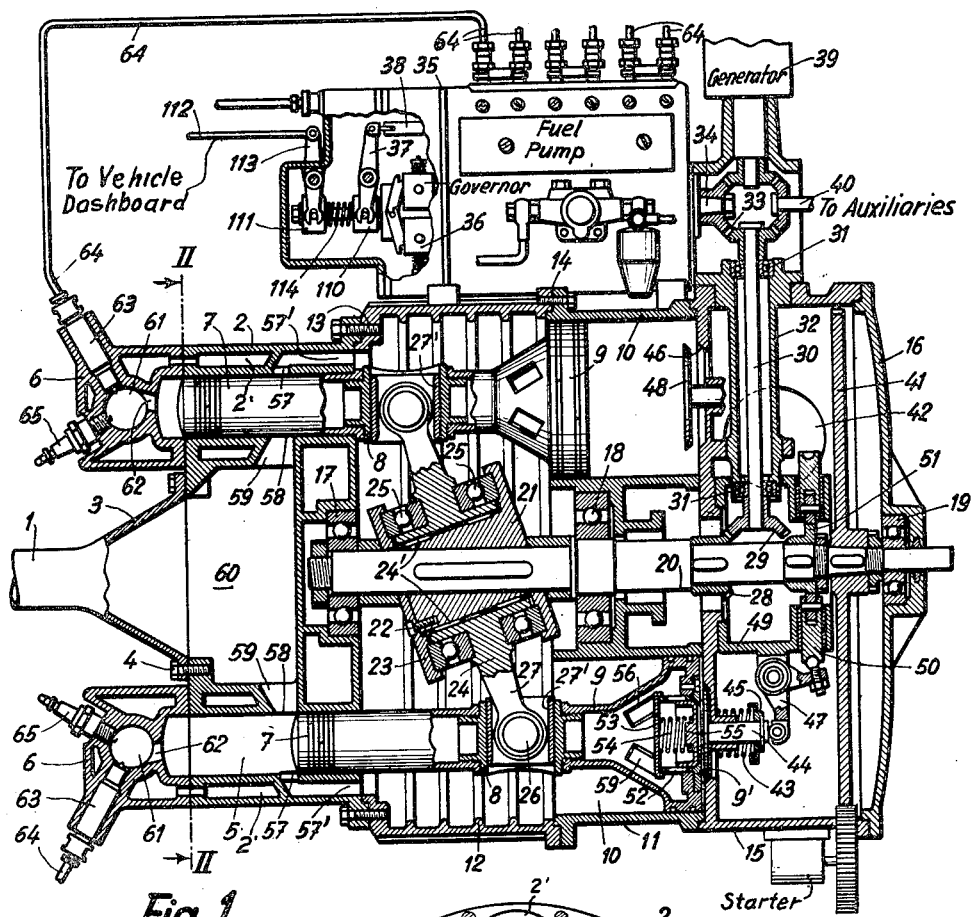
Fig. 1 is a longitudinal sectional view of a power gas generator in accordance with the invention.
Figure 2:
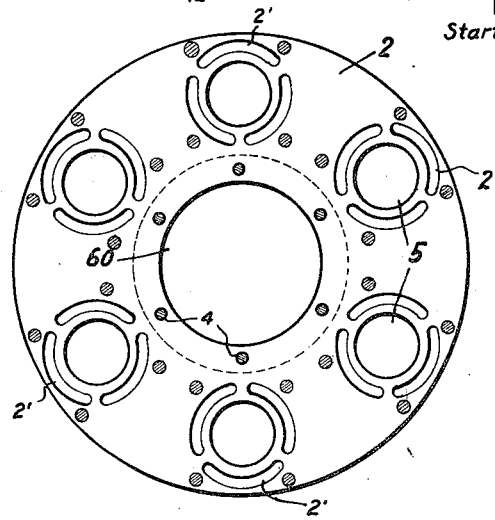
Fig. 2 is a cross-section taken approximately on the line II—II of Fig. 1.

The vehicle drive shown in the drawings comprises a power gas generator which is connected by a pipe 1 with the gas turbine which drives the vehicle through a change speed gear or transmission and a differential gear.

The power gas generator comprises six internal combustion engine cylinders 5 which are arranged in a circle with their axes parallel to one another and are disposed in a casing 2 to which the pipe 1 is connected by means of a flared portion 3 and bolts 4. Each of the cylinders has a cylinder head 6. Pistons 7 which are reciprocable in the cylinders 5 are rigidly connected with corresponding compressor pistons 9 by means of bearings 8 so as to form double pistons. The pistons 9 are reciprocable in compressor cylinders 10 which are coaxial with the combustion cylinders 5 and are enclosed in a compressor drum casing 11. The compressor cylinders are preferably of larger diameter than the combustion cylinders, as shown in the drawings (Fig. 1). A substantially cylindrical casing 12 is located between the casings 2 and 11, the three casings being connected with one another by peripheral flanges and bolts 13 and 14. A rear casing 15 is also secured to the drum casing 11 and is provided with a removable cover 16. A rotatable shaft 20 is centrally mounted in the casings 2, 11 and 15 by means of anti-friction bearings 17, 18 and 19. The shaft 20 carries an inclined disc or wobble plate by means of which the six double pistons 7—9 are kinematically coupled together so as to reciprocate in predetermined sequence. The inclined disc unit comprises a body portion 21 which is rigidly keyed to shaft 20, a plate 23 fixed to the body 21 by means of screws 22 and an inclined disc 24 which is rotatably mounted on the assembly 21, 23 by means of needle bearings 24' running on raceways which are inclined relative to the shaft 20 and thrust ball bearings 25 which are also inclined relative to the shaft. The inclined disc 24 has six radially projecting arms 27 on each of which a sleeve 27' is pivotally mounted by means of a trunnion 26. The sleeves 27 are slidable and rotatable in the bearings 8 interconnecting the pistons 7 and 9. Sequential reciprocation of the cylinders causes the disc 24 to wobble, thereby producing rotation of the body portion 21 and the shaft 20. During this movement, the sleeves 27' not only slide axially in the bearings 28 but also oscillate. This facilitates lubrication. In this connection, it may be mentioned that the lubrication system has not been shown, as it is within the purview of men skilled in the art.

The rotation of the shaft 20 is not used as a primary source of power but may conveniently be utilized for driving auxiliary equipment. Thus, as shown in Fig. 1, the shaft 20 acts through bevelled gears 28 and 29 to drive a vertical shaft 30 rotatably supported by antifriction bearings 31 in a sleeve 32 fixed to the casing 15. The latter shaft acts through bevelled gears 33 to drive the main shaft 34 of a fuel injection pump which is generally indicated at 35. A centrifugal governor 36 is associated with this pump and is adapted to act on the actuating rod 38 of the pump by means of a lever 37 to vary the output of the fuel injection pump in accordance with engine speed. Moreover, bevelled gearing 35 drives an electric generator 39 which supplies power for ignition and lighting. A further shaft 40 driven by the gearing 33 may be used for other auxiliary equipment, for example lubricating pumps or water-circulating pumps. A toothed fly-wheel 41, rigidly keyed on shaft 20, meshes with a starter gear driven by a suitable starter (not shown).

Atmospheric air is admitted to the casing 15 by means of one or more openings 42 which may, if desired, be provided with air filters. From the casing 15, air enters the compression cylinders 10 through inlet valves 48. The inlet valves are constructed as poppet valves, the movable valve members of which are normally pressed upon their seats 46 by means of coil springs 43 acting upon spring plates 45 fixed to valve rods 44. The movable valve members are positively actuated by a cam 51 keyed to shaft 20 and acting through tappets 50 slidably mounted in bores of an internal casing 49 which is fixed to the rear casing 15. The tappets 50 are connected with the valve members by means of adjustable bell cranks 47 pivotally mounted on the casing 49.

The inlet valves 48 are located in one end of the cylinders 10 while the opposite ends open into the casing 12. Each of the pistons 9 operating in the cylinders 10 is provided with a one-way valve or check valve comprising a valve seating made up with a cylindrical portion having air passages 52. The cylindrical portion is rigidly connected to a bottom portion 53 serving as a seat for a coiled spring 54 which presses a movable valve member 55 onto its seat in the end of the piston. Hence, the valves in the pistons act as pressure valves which open when the pressure in the compression chamber to the right hand side of the pistons, as viewed in Fig. 1, exceeds the pressure on the opposite sides of the pistons by an amount equal to the pressure of springs 54 and the pressure in the receiver formed by casing 12. The air thereupon flows through the openings 52 and through further passages 56 provided in the body of the piston into the rear portion of the compressor cylinders and thence into the casing 12 which constitutes a receiver for the compressed air.

The internal combustion units of the power gas generator comprising the combustion cylinders 5 operate as a two-cycle fuel injection spark ignition engine. The cylinders are shown provided with water jacket spaces 2'. Each combustion cylinder is provided with a scavenging port 57 which is connected with the compressed air receiver formed by casing 12 by means of a passage 57'. Each cylinder is also provided with an exhaust port 58 which discharges through a passage 59 into a pressure-equalizing chamber 60 within the casing 2. Both ports are controlled by the piston 7. When the piston is in its right hand position, as shown in the lower port of Fig. 1, both ports are open to admit compressed air from the receiver formed by casing 12 while, at the same time, permitting discharge of the combustion gases through the port 58. This construction avoids any air or gas pipes inside the gas generator.

Each of the cylinders 5 is provided with a spherical combustion chamber 61 which is connected with the cylinder by a passage 62. A fuel injection nozzle 63 and a sparkplug 65 both extend into the spherical combustion chamber 61. The injection nozzles 63 are connected to the fuel injection pump 35 by pressure tubes 64. The sparkplugs 65 are connected by means of conductors (not shown) with a suitable distributor and the ignition generator 39.

The mechanism shown in Figs. 3 and 4 comprises a turbine T having an inlet 66 which is connected by the pipe 1 with the pressure equalizing space 60 of the gas generator (Fig. 1) and an outlet 67 which is connected by a pipe 68 with a suitable exhaust box 68', a transmission providing two forward speeds and one reverse speed and a differential gear. The transmission and differential are housed in a casing 69 comprising two halves which are secured to each other by means of suitable screws (not shown), the casing being divided along a plane containing the axis of the turbine shaft and the axis of the output shaft of the transmission. The turbine shaft 70 is mounted in the casing 69 by means of ball bearings 71, 72. The turbine rotor 73 is mounted in cantilever fashion on a projecting end of the shaft 70. A brake drum 74 is rigidly keyed to an intermediate portion of the shaft 70 while a pair of gears 75 and 76 is slidably keyed to a splined portion of the shaft adjacent the brake drum 74 by means of its hub 77. An output shaft 81 rotatably mounted in the casing 69 by means of ball bearings 79, 80, carries two gears 82 and 83 and, at the end farthest away from the turbine, carries a bevel pinion 84 which is rigidly keyed to the shaft 81 as are also the gears 82, 83. The bevel pinion 84 meshes with the bevel sun wheel 85 of the differential gear having planetary gears 86 which mesh with gears 87 rigidly keyed to the driving axles 187 of the vehicle. A rod 189 connected with a gear shift lever to be operated by the vehicle driver, is slidably supported in the casing 69 and, at its inner end, carries a fork 189' engaging a circular groove 78 in the hub 77 of the gears 75, 76, to permit shifting the gears axially on the turbine shaft 70. In most driving conditions, the gears 75, 76 occupy a position in which gear 75 on the turbine shaft meshes with gear 82 on the output shaft. When still more torque is required, as, for example, in starting on an upgrade, the gear cluster 75, 76 is shifted toward the right (Fig. 3) so that power is transmitted to the differential gear through gears 76 and 83. To change to reverse speed, the gear cluster 75, 76 is shifted still farther to the right so that gear 75 meshes with a reversing gear 88 which is rotatably mounted in the casing 69 in position to mesh permanently with the gear 83 of the output shaft 81.

At the inlet side of the turbine rotor 73, the turbine casing is fitted with a fixed ring 90 carrying guide blades 89. A disc-shaped valve member 91 is rotatably mounted in the turbine casing immediately in front of the ring 90. The valve member 91 is oscillatable by means of a toothed gear segment 93 formed on the inner wall of a recess 92 in the valve member. This gear segment meshes with a pinion 94 which is rigidly keyed to a shaft 95 rotatably mounted in the casing 69 with its axis parallel to that of shaft 70. The shaft 95 is oscillatable by means of a radially projecting arm 96 which is rigidly carried by the shaft. The shaft 95 also carries a brake toggle or cam 97 which is rigidly mounted on the shaft and acts on brake shoes 99 which are swingable about a pivot pin 98 anchored in the casing 69 to swing the shoes into engagement with the inner periphery of the brake drum 74 on shaft 70 when the control shaft 95 is rotated. The lever arm 96 on the control shaft 95 is connected with the cable 101 of a Bowden wire by means of a bifurcated end portion 100 engaging a pin 120 affixed to the cable. The sheath 102 of the Bowden wire has its end abutting a fixed wall 103. One end of the cable 101 is affixed to a screw 104 on which a spring plate 105 is adjustably mounted. A coiled compression spring 107 acts between the spring plate 105 and a fixed wall 106, tending to move the cable 101, and hence the upper end of arm 96, toward the left, as viewed in Fig. 4. The opposite end of the cable 101 is connected to a suitable control member, for example the accelerator pedal of the vehicle. The ring 90 has a plurality of inlet openings 108 for admitting gas to the turbine. The oscillatable disc 91 has a corresponding number of apertures 91' which are longer than apertures 108. By oscillating the disc 91 so as to bring the apertures 108 and 91' into registry with one another to a greater or lesser degree, the flow of gas into the turbine can be controlled. The oscillatable disc or valve member 91 thus constitutes in effect a throttle valve controlling the flow of pressure gas from the gas generator to the turbine.

The method of operation of the device in accordance with the invention will now be described in conjunction with the accompanying drawings.

With the accelerator pedal in released position, thus releasing the cable 101, the gas generator shown in Fig. 1 is started. The inlet apertures 108 of the turbine are completely uncovered by the valve disc 91. Therefore, the gas produced by the generator is not substantially compressed ahead of the turbine and the gas generator immediately runs at its normal speed so that the corresponding quantity of air is carried through the gas generator. Except for minor variations in atmospheric pressure, this quantity of air depends only on the speed at which the gas generator runs and is not subject to substantial variations if this speed remains constant. If an increased power output is now required, for example to accelerate the vehicle or to go up a hill, the driver depresses the accelerator pedal so that the cable 101 is moved toward the right (Fig. 4). That causes the lever arm 96 to be swung in a clockwise direction and the valve disc 91 to be revolved in a counter-clockwise direction so that the latter partially closes the inlet apertures 108 of the turbine. The effective size of these apertures is consequently diminished. This causes a backing up and compression of the gas in the pipe 1 and equalizing chamber 60 (Fig. 1). Consequently, the admission velocity of the gas to the turbine and the drop of temperature in the turbine are correspondingly increased, thereby increasing the output of the turbine. The higher gas pressure in advance of the turbine is transmitted back through the pipe 1, the pressure equalizing chamber 60, the engine cylinders 5 and the air receiver 12 to the compression cylinders 10 on the compression side of the pistons 9. However, the pressure-responsive valves 55 in the pistons 9 open only when the pressure in the compression chambers exceeds the pressure of the air on the left hand side of the pistons and of the springs 54 so that the compressor accordingly consumes more power. The engine units must therefore deliver more power and a correspondingly increased quantity of fuel must hence be injected into the combustion chambers 61. The increase in fuel is effected under control of the centrifugal governor 36 which is coupled to the injection pump 35. It should be noted that this governor does not work in the same manner as the governor of conventional vehicle engines but rather like those of engines which are intended to work at a constant sped. If, for example, the governor is set for a nominal speed of 1800 R. P. M., it may then work in the speed range of 1780 to 1820 R. P. M. automaticaly to adjust the quantity of fuel to be injected in accordance with changes in load.

When the power demand drops to its smallest value, the quantity of fuel to be injected into the combustion cylinders is so small that it would not provide an exposive mixture if mixed with all of the air contained in the cylinders. If is for this reason that the combustion chamber has been subdivided. As the fuel is injected into the relatively small spherical portion 61, an explosive mixture is provided in this portion of the chamber, even though a very small quantity of fuel is supplied. Thorough tests have shown that this arrangement assures full working conditions at all loads.

When the pressure upon the accelerator pedal is released to a certain extent, a stage will occur in which the edges 91'' of the apertures in the valve disc 91 are in alignment with the edges 108' of the inlet apertures in ring 90. The inlet apertures 108 are then fully opened but the shoes 99 of the brake (Fig. 3) do not yet exert any pressure on the drum 74. When the pressure on the accelerator pedal is fully released, the inlet apertures 108 remain wholly open because the openings 91' in the valve disc 91 are longer than the openings 108 of the stationary ring 90. With the accelerator pedal wholly released, the brake shoes 99 are pressed into contact with the brake drum 74 by the spring 107 (Fig. 4) acting through the cable 101, the lever arm 96, shaft 95 and toggle 97. The described arrangement permits adjusting the brake action by adjusting the position of the spring seat 105 on the screw 104 (Fig. 4) so as to absorb a portion of the kinetic energy of the turbine rotor 73 corresponding to the friction in a conventional internal combustion vehicle engine. In this way, the vehicle is automatically decelerated slightly when the driver releases pressure on the accelerator pedal.

The centrifugal governor 36 is of the multistage type. In addition to a collar 110 which is shifted axially by the weight of the centrifugal governor 36, there is provided on the governor shaft a further collar 111 which is likewise axially slidable. The position of the collar 111 is adjustable by means of a rocker arm 113 and a linkage or Bowden wire 112 which extends, for example, to a lever or button arranged on the dashboard of the vehicle. A supplementary governor spring 114 is disposed between the two collars 110 and 111. Hence, movement of the collar 111 toward the right (Fig. 1) increases the effective spring pressure against which the governor works. This arrangement makes it possible to vary the nominal speed at which the gas generator runs. For example, by means of the dashboard control, the gas generator may be set to run either at a nominal speed of 1800 R. P. M. or at a nominal speed of 1200 R. P. M. With the gas generator running at 1200 R. P. M., the drive operates more economically for light loads. However, in normal operation, the speed of the gas generator is set at one value or another and is left at that setting so that the gas generator runs at a substantially constant speed, despite variations in load and variations in the speed of the turbine T.

Since a change in speed of the vehicle does not require any change in speed of the gas generator and since the volume of the equalizing chamber 60 and connecting pipe 1 is relatively small so that the pressure changes quickly with changes in the degree of opening of the turbine inlet apertures 108, the vehicle responds quickly and consistently to changes in pressure by the driver on the accelerator pedal.

It will be understood by those skilled in the art that the mechanism described above may be changed and adapted to the requirements of a specific case. In some instances, for example, the variable speed transmission, the special brake on the turbine shaft or the multistage controls on the governor may be dispensed with. Likewise, the governor need not necessarily be a centrifugal governor. It will be understood that the embodiment of the invention herein specifically shown and described is merely by way of example and is not intended to limit the scope of the appended claims.

What I claim and desire to secure by Letters Patent is:

1. A vehicle drive comprising an internal combustion pressure gas generator delivering a substantially constant weight of gas per unit of time when running at constant speed, a receiver for the pressure gas delivered by the generator, a gas turbine driven by gas from the receiver, means for transmitting the power output of the turbine to drive the vehicle, a throttle controlling the flow of gas from the receiver to the turbine, manually operable means for controlling said throttle to vary the throttle opening and thereby vary the pressure of gas accumulated in the receiver and hence the velocity of gas in the turbine, means for feeding fuel to the generator and a governor for regulating the feeding of the fuel to maintain the generator speed substantially constant at a predetermined value during changes in load resulting from said pressure variation, said throttle-controlling means being arbitrarily controllable independently of said governor.

2. In a vehicle drive, a pressure gas generator comprising a plurality of units each including an internal combustion cylinder and piston and a compressor cylinder and piston, the two pistons being kinematically coupled togeher, means for supplying fuel to the combustion cylinders, means for regulating the supply of fuel to maintain the speed of the generator substantially constant regardless of load, a receiver for the pressure gas delivered by said gas generator, a turbine driven by gas from the receiver, means for applying the power output of the turbine to drive the vehicle, a throttle controlling the flow of gas from the receiver to the turbine, means for varying the throttle opening and thereby varying the pressure of gas accumulated in the receiver and hence the velocity of gas delivered to the turbine, whereby turbine speed and power are controlled by varying said pressure and velocity while maintaining substantially constant the weight of gas delivered by said compressor cylinders to the receiver.

3. In a vehicle drive, a pressure gas generator comprising a series of internal combustion cylinders arranged in a circle, a piston in each of said cylinders, an equal number of compressor cylinders likewise arranged in a circle, a piston in each of said compressor cylinders, the pistons of the compressor cylinders being kinematically coupled to the pistons of the combustion cylinders, means for supplying fuel to the combustion cylinders, means for regulating the supply of fuel to maintain the speed of the generator substantially constant regardless of load, a receiver for the pressure gas delivered by said gas generator, a turbine driven by gas from the receiver, means for applying the power output of the turbine to drive the vehicle a throttle controlling the flow of gas from the receiver to the turbine, manually operable means for varying the throttle opening and thereby varying the pressure of gas accumulated in the receiver and hence the velocity of gas delivered to the turbine, whereby turbine speed and power are controlled by varying said pressure and velocity while maintaining substantially constant the weight of gas delivered by said compressor cylinders to the receiver.

4. In a vehicle drive, a pressure gas generator comprising a plurality of units arranged in a circle, each unit comprising a combustion cylinder, a compressor cylinder coaxial with each combustion cylinder, a double piston in each unit having one end operable in the combustion cylinder of the unit and the opposite end operable in the compressor cylinder, means kinematically interconnecting all of the pistons to cause them to operate in predetermined sequence, means for supplying fuel to the combustion cylinders, means for regulating the supply of fuel to maintain the speed of the generator substantially constant regardless of load, a receiver for the pressure gas delivered by said gas generator, a turbine driven by gas from the receiver, means for applying the power output of the turbine to drive the vehicle, a throttle controlling the flow of gas from the receiver to the turbine, manually operable means for varying the throttle opening and thereby varying the pressure of gas accumulated in the receiver and hence the velocity of gas delivered to the turbine, whereby turbine speed and power are controlled by varying said pressure and velocity while maintaining substantially constant the weight of gas delivered by said compressor cylinders to the receiver.

5. In a vehicle drive, a pressure gas generator comprising a plurality of units each including an internal combustion cylinder, a compression cylinder coaxial with the combustion cylinder and a double piston having one end operating in the combustion cylinder and the opposite end operating in the compression cylinder, each of said combustion cylinders having an exhaust port and a scavenging port, a receiver into which all of the compressor cylinders discharge, the scavenging ports of the combustion cylinders communicating with said receiver, an equalizing chamber into which the exhaust ports of the combustion cylinders discharge, means for injecting fuel to the combustion cylinders, means for igniting said fuel, means for regulating the supply of fuel to maintain the speed of the generator substantially constant regardless of load, a turbine having an inlet, means connecting the inlet with said equalizing chamber, means for varying the cross-sectional area of the inlet and thereby varying the pressure of gas accumulated in the receiver and the equalizing chamber and hence the velocity of gas delivered to the turbine whereby turbine speed and power are controlled by varying said pressure and velocity while maintaining substantially constant the weight of gas delivered by said compressor cylinders and means for applying the power output of the turbine to drive the vehicle.

6. In a vehicle drive, a pressure gas generator comprising a plurality of units each including an internal combustion cylinder, a combustion chamber communicating with the cylinder, a compression cylinder coaxial with the combustion cylinder and a double piston having one end operating in the combustion cylinder and the opposite end operating in the compression cylinder, each of said combustion cylinders having an exhaust port and a scavenging port, a receiver into which all of the compressor cylinders discharge, the scavenging ports of the combustion cylinders communicating with said receiver, an equalizing chamber into which the exhaust ports of the combustion cylinders discharge, means for injecting fuel into each of the combustion chambers, means for igniting said fuel, means for regulating the supply of fuel to maintain the speed of the generator substantially constant regardless of load, a turbine having an inlet, means connecting the inlet with said equalizing chamber, means for varying the cross-sectional area of the inlet and thereby varying the pressure of gas accumulated in the receiver and the equalizing chamber and hence the velocity of gas delivered to the turbine whereby turbine speed and power are controlled by varying said pressure and velocity while maintaining substantially constant the weight of gas delivered by said compressor cylinders and means for applying the power output of the turbine to drive the vehicle.

7. A vehicle drive according to claim 6 in which the combustion chambers are essentially spherical.

8. In a vehicle drive, a pressure gas generator comprising a gas receiver, a plurality of units grouped around the receiver, each of said units comprising a combustion cylinder and a compressor cylinder coaxial with one another and arranged on opposite sides of said receiver, and a double piston having one end operating in the combustion chamber and the opposite end operating in the compression cylinder, each of said compression cylinders opening at one end into said receiver, an inlet valve at the other end of each of said compression cylinders, a spring loaded check valve in each piston to permit gas to pass through the piston only in a direction toward said receiver, the combustion cylinders having scavenging ports communicating with said receiver and exhaust ports, an equalizer chamber into which the exhaust ports of the combustion chambers discharge, a gas turbine having an inlet, means connecting the inlet of the turbine with the equalizer chamber and means for applying the power output of the turbine to drive the vehicle.

9. In a vehicle drive, a pressure gas generator comprising a plurality of units arranged in a circle, each of said units comprising a combustion cylinder and a compressor cylinder coaxial with one another and a double piston having one end operating in the combustion chamber and the opposite end operating in the compressor cylinder, a gas receiver disposed between the combustion cylinder and the compression cylinders, a rotatable shaft extending through the receiver and coaxial with the circle of units, a bearing carried by said shaft with its axis inclined relative to that of the shaft, an inclined disc rotatable on said bearing and disposed in said receiver, operative connections between the disc and the pistons whereby reciprocation of the pistons in predetermined sequence imparts a wobble motion to the disc and rotation to the shaft, a gas turbine having an inlet and means connecting the inlet of the turbine with the receiver and means for applying the power output of the turbine to drive the vehicle.

10. A vehicle drive comprising an internal combustion pressure gas generator for delivering a constant weight of gas per unit of time when running at constant speed, means for maintaining the speed of the generator substantially constant regardless of load, a receiver for the pressure gas delivered by the generator, a gas turbine having a rotor driven by gas from the receiver, means for applying the power output of the turbine to drive the vehicle, a throttle opening being variable to vary the pressure of gas accumulated in the receiver and hence the velocity of gas in the turbine, a brake for applying braking force to the turbine rotor and a unitary control for said throttle and brake acting to apply the brake when the throttle is fully open.

11. In a system for driving a vehicle, a gas driven turbine having a gas inlet, means for transmitting the power output of the turbine to drive the vehicle, a gas generator having a gas outlet connected to the gas inlet of said turbine and operable at constant speed to supply a substantially constant weight of gas to said turbine, means for maintaining the speed of said gas generator substantially constant independently of load, and control means for regulating the power output of said turbine and thereby controlling said vehicle comprising means for variably and arbitrarily restricting the flow of gas from the generator to the turbine to vary the pressure of gas delivered to the turbine and thereby vary the power developed by the turbine, said flow being restricted to increase gas pressure and thereby increase turbine power while the weight of the gas delivered by the gas generator to the turbine remains substantially the same.

12. In a system for driving a vehicle, a gas-driven turbine having a gas inlet, means for transmitting the power output of the turbine to drive the vehicle, an internal combustion gas generator having a gas discharge connected to the gas inlet of the turbine and operable at constant speed to supply a substantially constant weight of gas to the turbine, speed-responsive means for varying the amount of fuel fed to said gas generator to maintain the speed of said generator substantially constant regardless of load and control means for varying the power output of the turbine and thereby controlling said vehicle, comprising means for variably and arbitrarily restricting the flow of gas from the gas generator to the turbine to vary the pressure of gas delivered to the turbine and thereby vary the power developed by the turbine, said flow being restricted to increase gas pressure and thereby increase turbine power, the weight of gas delivered by the gas generator to the turbine remaining substantially constant while the temperature of said gas is increased by reason of the increased fuel required to maintain the speed of said generator constant despite the increased load resulting from the higher discharge pressure of the gas generator.

References Cited in the file of this patent

UNITED STATES PATENTS

| | | |
|---|---|---|
| 1,670,355 | Harris | May 22, 1928 |
| 2,083,730 | Michell | June 15, 1937 |
| 2,115,921 | Steiner | May 3, 1938 |
| 2,123,009 | Johansson | July 5, 1938 |
| 2,147,935 | Steiner | Feb. 21, 1939 |
| 2,201,682 | Johansson | May 21, 1940 |
| 2,222,379 | Smith | Nov. 19, 1940 |
| 2,253,530 | Pateras Pescara | Aug. 26, 1941 |
| 2,355,177 | Pateras Pescara | Aug. 8, 1944 |
| 2,373,028 | Kennedy | Apr. 3, 1945 |
| 2,375,852 | Kilchenmann | May 15, 1945 |
| 2,413,957 | Daub | Jan. 7, 1947 |
| 2,485,655 | Polk | Oct. 25, 1949 |

FOREIGN PATENTS

| | | |
|---|---|---|
| 262,044 | Great Britain | Feb. 2, 1928 |